United States Patent Office 3,277,125
Patented Oct. 4, 1966

3,277,125
5β,6β-METHANOESTRENES
John S. Tadanier, Chicago, Ill., assignor to Abbott Laboratories, Chicago, Ill., a corporation of Illinois
No Drawing. Filed Mar. 2, 1965, Ser. No. 436,639
5 Claims. (Cl. 260—397.4)

The present invention is directed to 17-substituted 3β-methoxy - 5β,6β - methanoestr - 9-enes and a process for preparing these compounds. These new compounds are useful androgens and are growth-regulating agents when administered to warm-blooded animals. They have the structure

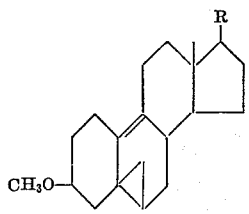

wherein R is oxygen, hydroxy, or acetoxy.

The new compounds are made by reacting 7β-hydroxy-3β-methoxy-B-homoestr-5(10)-en-17 - one with methanesulfonyl chloride in pyridine and isolating from the reaction mixture the 3β-methoxy-5β,6β-methanoestr-9-en-17-one which can be converted by known procedures into the corresponding 17-hydroxy compound and, in turn, to the 17-acetoxy analog. The reaction with methanesulfonyl chloride can be carried out at a temperature between —10° and 50° C., but preferably between 0° C. and room temperature. At least a molar equivalent of methanesulfonyl chloride should be present to obtain good yields of the desired end product; however, the methanesulfonyl chloride may be present in a large excess which can easily be destroyed after completion of the reaction by the addition of water.

In a preferred embodiment, the reactants are brought together under ice cooling and stirring, and after the addition of the methanesulfonyl chloride to the steroidal starting material is completed, the reaction mixture is allowed to stand for at least one hour at room temperature. Water and ether are then added to the reaction mixture; the water destroys any excess of methanesulfonyl chloride and the ether serves as the extractant for the desired end product. The ether extracts are worked up in routine fashion.

In order to illustrate the process of the present invention, reference is made to the following examples which are not meant to limit the invention.

EXAMPLE 1

3β-methoxy-5β,6β-methanoestr-9-en-17-one

A solution of 403 mg. of 7β-hydroxy-3β-methoxy-B-homoestr-5(10)-en-17-one (described in Tetrahedron Letters, No. 21, pages 1345–52, of 1964) in 8 ml. of pyridine is cooled in an ice bath and 0.42 ml. of methanesulfonyl chloride is added to the stirred solution. Stirring is continued under cooling for 10 minutes and the resulting solution is then allowed to stand at room temperature for 3 hours. The reaction mixture is shaken with a mixture of 100 ml. of ether and 80 ml. of water. The aqueous phase is separated and washed with two 80-ml. portions of ether. The ether solutions are washed in series with 50 ml. of water, 50 ml. of 5% sodium bicarbonate solution, and three 50-ml. portions of water. Finally, the ether solutions are combined and dried over anhydrous magnesium sulfate. The ether is evaporated and the residual pyridine is removed by azeotropic distillation with benzene under reduced pressure, leaving 340 mg. of a yellow solid.

A solution of the above yellow solid in benzene is placed on a column of 14 grams of neutral, activity III alumina and eluted with 50 ml. of benzene to yield 247 mg. of a white solid. Three recrystallizations from ether/pentane solutions yield 107.1 mg. of 3β-methoxy-5β,6β-methanoestr-9-en-17-one melting at 119–122° C.; $[\alpha]_D^{24}$ (chloroform) +93°. The new compound is further characterized by the absence of the vinyl proton absorption in the nuclear magnetic resonance spectrum. The analytical values of the new compound are in good agreement with the empirical formula $C_{20}H_{28}O_2$.

A second crop of 60 mg. of the material with a melting point of 117–122° C. is obtained from the above mother liquors.

EXAMPLE 2

3β-methoxy-17β-hydroxy-5β,6β-methanoestr-9-ene

A solution of 30 mg. of 3β-methoxy-5β,6β-methanoestr-9-en-17-one in 3 ml. of methanol and a freshly prepared solution of 120 mg. of sodium borohydride in 2 ml. of methanol are combined at room temperature. After 30 minutes, the solution is poured into water and the mixture is extracted with ether. The ether phase is washed with water and dried over anhydrous magnesium sulfate. Evaporation of the ether leaves 3β-methoxy-17β-hydroxy-5β,6β-methanoestr-9-ene which is purified by recrystallization from ether/pentane. The analytical values are in good agreement with the empirical formula $C_{20}H_{30}O_2$.

EXAMPLE 3

3β-methoxy-17β-acetoxy-5β,6β-methanoestr-9-ene

A solution of 20 mg. of the product of Example 2 in 2 ml. of pyridine is treated with 0.3 ml. of acetic anhydride. The solution is allowed to stand for 6 hours at room temperature and is then poured into water. The aqueous mixture is extracted with ether and the ether solution is washed with water and dried over anhydrous magnesium sulfate. Evaporation of the solvent leaves 3β - methoxy-17β-acetoxy-5β,6β-methanoestr-9-ene. The analytical values obtained after recrystallization from ether-pentane are in good agreement with those calculated for the empirical formula $C_{22}H_{32}O_3$.

Others may practice the invention in any of the numerous ways which will be suggested to one skilled in the art by the present disclosure. All such practice of the invention is considered a part hereof provided it falls within the scope of the appended claims.

I claim:
1. The process comprising treating 7β-hydroxy-3β-methoxy - B - homoestr - 5(10)-en-17-one with at least a molar equivalent of methanesulfonyl chloride in pyridine at a temperature between —10° and 50° C., adding water to the reaction mixture, and isolating from the reaction mixture 3β-methoxy-5β,6β-methanoestr-9-en-17-one.

2. A compound of the formula
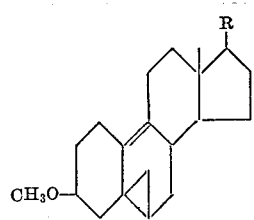
wherein R is selected from the group consisting of hydroxy, acetoxy, and oxo.
3. 3β-methoxy-5β,6β-methanoestr-9-en-17-one.
4. 3β-methoxy-17β-hydroxy-5β,6β-methanoestr-9-ene.
5. 3β-methoxy-17β-acetoxy-5β,6β-methanoestr-9-ene.
No references cited.
LEWIS GOTTS, *Primary Examiner.*
HENRY A. FRENCH, *Assistant Examiner.*